Aug. 21, 1962    J. L. EDWARDS    3,050,003
PUMP ALARM AND CONTROL DEVICE
Filed Oct. 21, 1960    2 Sheets-Sheet 1

INVENTOR.
JACK L. EDWARDS
BY
McMorrow, Berman & Davidson
ATTORNEYS

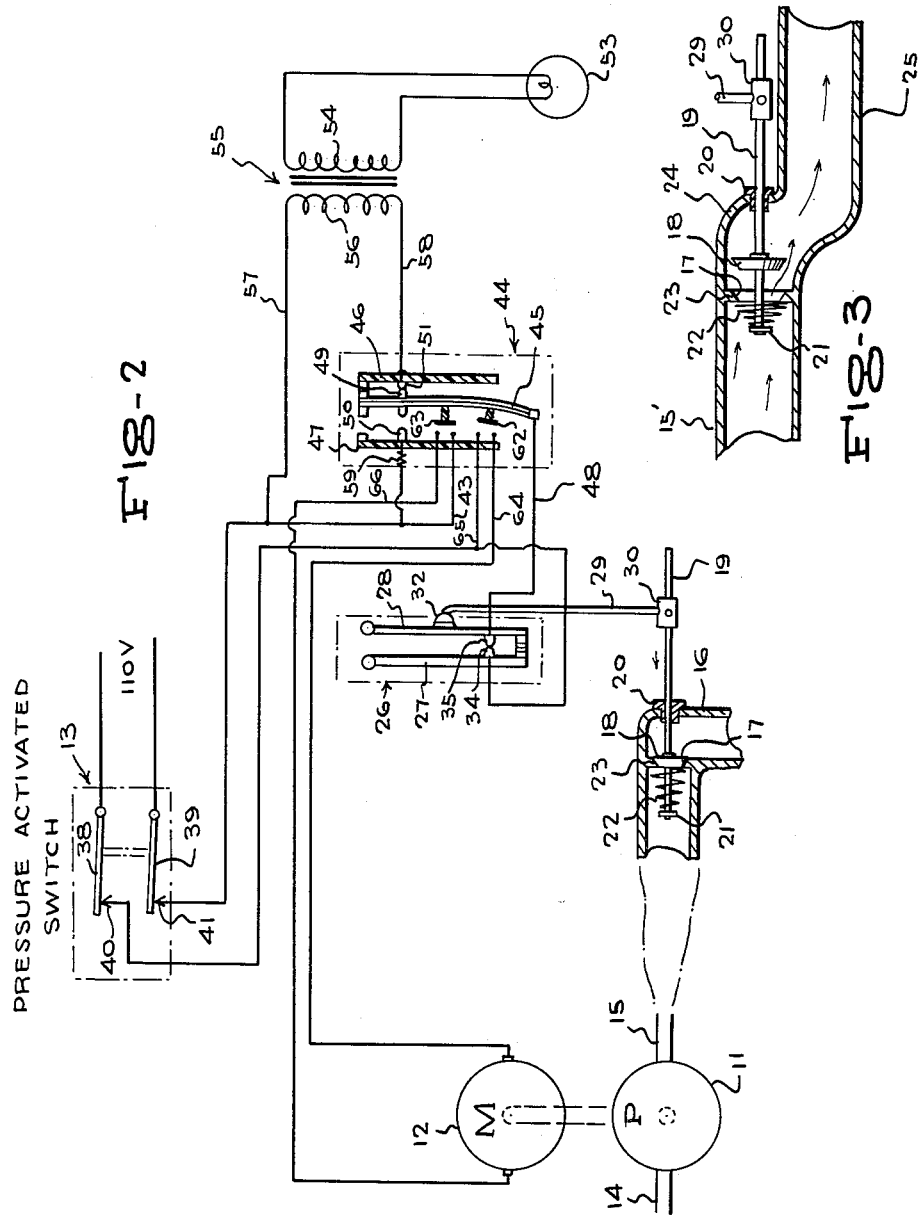

United States Patent Office 3,050,003
Patented Aug. 21, 1962

1

3,050,003
PUMP ALARM AND CONTROL DEVICE
Jack L. Edwards, 10475 Cornell St., Indianapolis, Ind.
Filed Oct. 21, 1960, Ser. No. 64,037
5 Claims. (Cl. 103—25)

This invention relates to electrical alarm systems, and more particularly an automatic alarm and control circuit for an electrically powered liquid circulating system, for example, a well pump system.

A main object of the invention is to provide a novel and improved alarm and control circuit for an electrically driven liquid circulation system, the circuit involving relatively simple components, being reliable in operation, and being arranged to provide a definite alarm indication responsive to a reduction in flow in the system below a predetermined rated value.

A further object of the invention is to provide an improved control and alarm circuit for an electrically powered liquid circulation system, the circuit involving inexpensive components, being easy to install, and operating automatically to provide an alarm indication as well as to deenergize the main driving motor of the system in response to reduction in flow below a predetermined amount in the output line associated with the pump member of the system.

A still further object of the invention is to provide an improved automatic control and alarm system for a pump, for example, for a well pump associated with a storage tank which must be supplied with liquid by the pump, the device employing a relatively simple and inexpensive circuit which is immune to false operations caused by momentary fluctuations in the flow of the liquid in the system but which responds to provide a positive alarm indication and to deenergize the pump member of the system when a reduction in flow in the output line of the pump occurs which continues for a predetermined period of time, thus preventing permanent damage to the components of the system and enabling malfunctions thereof to be corrected before such permanent damage occurs.

Further objects and advantages of the invention will become apparent from the following description and claims, and from the accompanying drawings, wherein:

FIGURE 2 is an electrical wiring diagram, similar to FIGURE 1, but showing the positions assumed by the parts when the output flow of the pump member is reduced to a value below the minimum safe value.

FIGURE 3 is an enlarged longitudinal vertical cross sectional view taken through an offset output line provided with flow-responsive switch-operating means which may be employed in a system according to the present invention.

Figure 1:
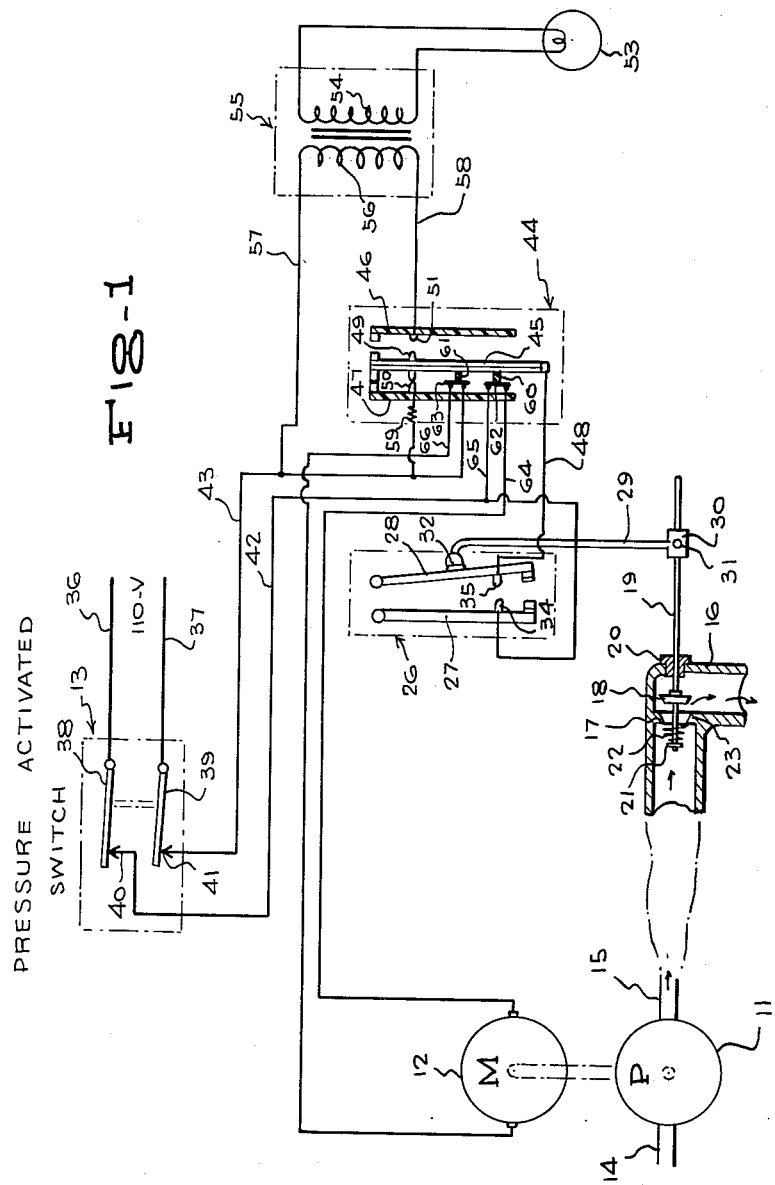
FIGURE 1 is an electrical wiring diagram showing an improved alarm and control circuit according to the present invention with the elements thereof in normal positions, namely, in the positions assumed thereby when normal flow is taking place in the output line associated with the pump member of the system.

Referring to the drawings, 11 designates a pump which is driven by an electric motor 12, the pump 11 being associated with a liquid reservoir, not shown, which must be supplied with liquid, for example, with water from a well, when the level of liquid in the reservoir drops below a predetermined value. Thus, the reservoir may be provided with a pressure-responsive switch, shown diagrammatically at 13, suitably located in the reservoir and closing when the level of the liquid drops below the required value in the reservoir. FIGURES 1 and 2 show the pressure-responsive switch device 13 in closed position, corresponding to a condition wherein the pump 11 is called upon to replenish the supply of liquid in the reservoir.

2

The pressure-responsive switch 13 is conventional per se and in itself forms no part of the present invention.

The pump 11 is connected in a manner to draw the liquid from the well and is provided with the input line 14 and the output line 15, said output line leading to the associated reservoir. In the form of the invention illustrated in FIGURE 1, the output line 15 includes an elbow portion 16 which is provided internally with an annular gate or valve seat 17 located adjacent the right angled bend of the elbow 16, and which is provided with a cooperating frusto conical valve member 18 mounted on a valve rod 19 which is sealingly and slidably mounted in the wall of the elbow 16, for example, being sealingly and slidably mounted in a bushing 20 secured in the wall in the manner illustrated in FIGURE 1, and arranged so that the rod 19 extends axially with respect to the output line 15. As shown in FIGURE 1, the inner end portion of the rod 19 extends through the valve seat 17 and is provided at its inner end portion with an abutment washer 21 which is engaged by one end of a coiled spring 22 surrounding the rod 19, the other end of the coiled spring bearing on the wall of the partition 23 in which the conical valve seat 17 is formed, whereby the valve element 18 is biased towards closing position with respect to the seat 17. When normal flow occurs in the output line 15, the liquid exerts sufficient force against the valve element 18 to overcome the biasing effect of the spring 22, whereby the rod 19 is relatively extended from the elbow member 16, in the manner illustrated in FIGURE 1.

When the fluid flow in the line 15 drops below a predetermined safe value, the spring 22 expands, as shown in FIGURE 2, causing the frusto conical valve element 18 to engage in the seat 17, and causing the rod 19 to be retracted, namely, to be moved to the left, as viewed in FIGURE 1, to the position shown in FIGURE 2.

As shown in FIGURE 3, the output line, shown at 15' may be provided with an offset 24, and the partition wall 23 may be provided in the upstream portion of the offset with the rod 19 extending slidably through the supporting bushing 20 in the manner illustrated, said bushing being mounted in the wall of the offset so that the rod 19 will be supported axially relative to the conduit portion 15'. Thus, as shown in FIGURE 3, the rod 19 will be supported in a position parallel to but spaced from the downstream portion 25 of the offset but will otherwise funciton in the same manner as in the case of the elbow arrangement shown in FIGURES 1 and 2.

Designated generally at 26 is a switch comprising a stationary contact arm 27 and a pivoted contact arm 28, the switch 26 being located adjacent the rod 19 and the pivoted contact arm 28 being connected to the rod 19 by an arm 29. Arm 29 is rigidly connected to the rod 19 by the fastening sleeve 30 which is rigidly connected to one end of the arm 29 and which receives the rod 19, the rod 19 being secured in suitably adjusted position in the sleeve 30 by means of a fastening screw 31 provided in the sleeve. The opposite end of the arm 29 is pivotally connected to the arm 28 by a ball and socket joint 32, as illustrated, sufficient looseness being provided in the connection so that arm 28 will be rotated responsive to rectilinear movement of the rod 19. In the normal position illustrated in FIGURE 1, the arm 28 is held away from the opposing stationary arm 27, but in the condition illustrated in FIGURE 2, namely, when the flow in the output line 15 drops below a safe value, the contact arm 28 is rotated into engagement with the opposing arm 27.

Arm 27 is provided with a contact element 34 and arm 28 is provided with a cooperating contact element 35 engageable with the contact element 34 under the conditions illustrated in FIGURE 2.

Designated respectively at 36 and 37 are supply conductors which are connected to a suitable source of current, for example, to a conventional 110 volt alternating current power supply. The conductors 36 and 37 are connected through the poles 28 and 39 of the pressure-responsive switch 13 and through the associated stationary contacts 40 and 41 of said switch to respective wires 42 and 43. The wire 42 is connected to the contact element 34 associated with the stationary switch pole 27.

Designated generally at 44 is a slow-acting relay device which may comprise a thermal relay having a bimetal operating element 45 which is suitably mounted in a housing and which is disposed between a pair of non-conducting supports 46 and 47 arranged on opposite sides of the bimetal arm 45, the lower end of the arm 45 being suitably fastened in the housing of the unit 44 so that the upper portion of the arm is free to flex thermally. The fixed end of the arm 45, namely, the bottom end thereof, as shown in FIGURES 1 and 2, is electrically connected by a suitable flexible wire 48 to the contact element 35 associated with the pivoted arm 28.

The bimetal arm 45 is provided at its upper portion with a contact pin 49 which is secured in and which extends through the arm and projects on opposite sides thereof, the left end of the pin 49, as viewed in FIGURE 1, normally engaging a stationary contact element 50 mounted in the insulating support member 47, but the pin 49 being movable at times into engagement with a stationary contact element 51 mounted in the insulating supporting member 46. The pin 49 engages the contact element 51 under conditions illustrated in FIGURE 2, namely, when the bimetal arm 45 flexes due to the heat developed therein by current flow therethrough, as will be presently described.

Designated at 53 is an alarm lamp, which may alternatively be any suitable type of electrically operated alarm device, such as a bell, buzzer, or the like, the alarm device 53 being connected to the terminals of the secondary winding 54 of a transformer 55. One terminal of the primary 56 of transformer 55 is connected by a wire 57 to the wire 43 and the remaining terminal of primary 56 is connected by a wire 58 to the stationary contact element 51. Contact element 50 is connected to the wire 43 through a suitable current limiting resistor 59, the resistor 59 being of sufficient resistance to prevent overloading the supply lines 36 and 37 when the bimetal arm 45 is connected thereto, as will be presently described. The resistor 59 may be in heat transmitting relationship to the arm 45 so that the current flowing in resistor 59 will contribute to the rise in temperature of the bimetal arm 45 under alarm conditions.

Secured on the arm 45 in spaced positions are respective insulating support members 60 and 61 on which are mounted respective switch poles 62 and 63, the poles 62 and 63 normally bridging associated cooperating pairs of contacts mounted on the insulating support member 47 and connected respectively to pairs of wires 64, 65 and 43, 66. The wire 66 is connected to one terminal of the pump motor 12 and the wire 64 is connected to the opposite terminal of said motor. The wire 65 is connected to the wire 42.

When the liquid flow in the output line of the pump 11 fails, due to some malfunction in the system, the rod 19 is retracted, namely, is moved to the left, from the position shown in FIGURE 1 to the position shown in FIGURE 2, causing arm 28 to swing towards the stationary arm 27 and causing contact 35 to engage contact 34. This connects the bimetal arm 45 to the line wires 36 and 37 by a circuit comprising line wire 36, switch pole 38, contact 40, wire 42, contact element 34, contact element 35, wire 48, the bimetal arm 45, contact pin 49, contact element 50, current-limiting resistor 59, wire 43, switch contact 41, pole 39, and line wire 37. After a predetermined time delay, whose value may be established by proper selection of the value of the current-limiting resistor 59, the bimetal arm 45 flexes away from the position thereof illustrated in FIGURE 1 and assumes the position thereof shown in FIGURE 2. This opens the circuit of the motor 12, since the poles 63 and 62 are disengaged from their associated contacts, disconnecting the motor supply line wires 66 and 64 from the current supply wires 43 and 65 associated therewith, thereby stopping operation of the pump. Immediately thereafter, the contact pin 49 engages the stationary contact element 51, energizing the primary 56 of transformer 55 through a circuit comprising line wire 36, switch pole 38, contact 40, wire 42, contact element 34, contact element 35, wire 48, the bimetal arm 45, contact pin 49, contact element 51, wire 58, the primary 56, wire 57, wire 43, contact element 41, pole 39, and line wire 37. This energizes the alarm device 53 which provides the alarm indication. Thus, the energization of the alarm device 53 will indicate that there is a malfunction in the system so that suitable steps may be taken to correct same. If no action is taken, the bimetal arm 45 will cool down after a period of time, since relatively little current flows through the bimetal arm when it is connected in series with the primary 56. Upon cooling, the bimetal arm 45 will resume its position illustrated in FIGURE 1, wherein the motor 12 is re-energized and the bimetal arm 45 is again connected to the line through the current-limiting resistor 59, causing a repetition of the alarm cycle. This will continue as long as normal flow cannot take place in the output line 15, or 15'.

It will be noted that the circuit will not cause unnecessary alarm indications when momentary fluctuations occur in the output line of the pump, since a definite time period is required for the bimetal arm 45 to flex from the position of FIGURE 1 to the position of FIGURE 2.

While certain specific embodiments of an improved alarm and control system for use with a well pump or similar arrangement have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination, a pump, an output line connected to said pump, a flow-responsive switch device operatively mounted in said output line and closing when the flow in said output line decreases below a predetermined amount, an electrically operated alarm device, a source of current, a slow-acting relay device having a conductive operating element and normally open contacts closing responsive to the flow of a substantial amount of current through said operating element for a predetermined time period, means connecting said source to said alarm device through said contacts, normally closed switch means controlled by said operating element and opening responsive to deflection of the element, means connecting said source to said operating element through said switch means, and means connecting said source to said operating element through said flow-responsive switch device, whereby said operating element is energized responsive to the decrease of flow below said predetermined amount and closes said contacts after said predetermined time period.

2. In combination, a pump, an output line connected to said pump, a flow-responsive switch device operatively mounted in said output line and closing when the flow in said output line decreases below a predetermined amount, an electrically operated alarm device, a source of current, a thermal relay having a conductive operating element and normally open contacts closing responsive to the flow of a substantial amount of current through said operating element for a predetermined time period, said operating element closing said contacts responsive to heat developed in the element due to current flow therethrough for said predetermined time period, normally closed switch means controlling said operating element and opening responsive to deflection of the element, means connecting said source to said operating element through said switch means, means connecting said source to said alarm device through said contacts, and means connecting said source to said operating element through said flow-responsive switch device, whereby said operating element is connected to said source of current responsive to the decrease of flow below said predetermined amount and closing said contacts after said time period.

3. In combination, a pump, an output line connected to said pump, a flow-responsive switch device operatively mounted in said output line and closing when the flow in said output line decreases below a predetermined amount, an electrically operated alarm device, a source of current, a thermal relay comprising a conductive bimetal arm which deflects responsive to heat, a first contact normally engaged by said bimetal arm, normally closed switch means controlled by said arm and opening responsive to deflection of the arm, means connecting said source to said arm through said switch means, a second contact engageable by said bimetal arm when it deflects thermally responsive to the flow of a substantial amount of current through said arm for a predetermined time period, means connecting said source to said alarm device through said second contact and said arm, and means connecting said source to said first contact and arm through said flow-responsive switch device, whereby said arm is connected to said source when the flow decreases below said predetermined amount and the alarm device becomes energized after said predetermined time period.

4. In combination, a pump, a motor drivingly connected to said pump, an output line connected to said pump, a flow-responsive switch device operatively mounted in said output line and closing when the flow in said output line decreases below a predetermined amount, an electrically operated alarm device, a source of current, a thermal relay comprising a conductive bimetal arm which deflects responsive to heat, a first contact normally engaged by said bimetal arm, normally closed switch means controlled by said arm and opening responsive to deflection of the arm, means connecting said source to said motor through said switch means, a second contact engageable by said bimetal arm when it deflects thermally responsive to the flow of a substantial amount of current through said bimetal arm for a predetermined time period, means connecting said source to said alarm device through said second contact and said bimetal arm, and means connecting said source to said first contact and arm through said flow-responsive switch device, whereby said arm is connected to said source when the flow decreases below said predetermined amount, and whereby the motor is deenergized by the deflection of the arm and the alarm device becomes energized after said predetermined time period.

5. In combination, a pump, a motor drivingly connected to said pump, an output line connected to said pump, a flow responsive switch device operatively mounted in said output line and closing when the flow in said output line decreases below a predetermined amount, an electrically operated alarm device, a source of current, a thermal relay comprising a conductive bimetal arm which deflects responsive to heat, a first contact normally engaged by said bimetal arm, a switch pole carried by said arm, a pair of contacts normally engaged by said pole, said pole disengaging from said contacts responsive to thermal deflection of the arm, means connecting said source to said motor through said pair of contacts, a further contact engageable by said bimetal arm when it deflects thermally responsive to the flow of a substantial amount of current through said arm for a predetermined time period, means connecting said source to said alarm device through said further contact and said arm, and means connecting said source to said first contact and arm through said flow-responsive switch device, whereby said arm is connected to said source when the flow decreases below said predetermined amount, and whereby the motor is deenergized by the deflection of the arm and the alarm device becomes energized after said predetermined time period.

References Cited in the file of this patent

UNITED STATES PATENTS

| | | |
|---|---|---|
| 983,861 | Pool | Feb. 7, 1911 |
| 2,494,124 | Hegy | Jan. 10, 1950 |
| 2,659,881 | Bogot et al. | Nov. 17, 1953 |
| 2,698,929 | Greacen et al. | Jan. 4, 1955 |